United States Patent [19]

Nishii

[11] Patent Number: 4,786,093
[45] Date of Patent: Nov. 22, 1988

[54] FRONT BUMPER ASSEMBLY FOR RETRACTABLE HEAD LAMP-EQUIPPED VEHICLE

[75] Inventor: Shigetoshi Nishii, Sagamihara, Japan

[73] Assignee: Nissan Motor Co., Ltd., Japan

[21] Appl. No.: 59,528

[22] Filed: Jun. 8, 1987

[30] Foreign Application Priority Data

Jun. 24, 1986 [JP] Japan .................................. 61-147594

[51] Int. Cl.⁴ .............................................. B60R 19/03
[52] U.S. Cl. .................................... 293/120; 293/121; 293/155; 362/65; 362/82
[58] Field of Search .................... 362/63, 64, 65, 82, 362/83; 293/110, 117, 120–122, 126–128, 132–137, 142, 154, 155, 102; D26/28, 29, 139; D12/167–172; 267/139

[56] References Cited

U.S. PATENT DOCUMENTS

| | | | |
|---|---|---|---|
| 3,387,125 | 6/1968 | Ingolia | 362/65 |
| 3,884,516 | 5/1975 | Gallion et al. | 293/117 X |
| 3,897,095 | 7/1975 | Glance et al. | 293/120 |
| 3,897,967 | 8/1975 | Barenyi | 293/120 |
| 3,937,508 | 2/1976 | Glance et al. | 293/126 X |
| 4,010,969 | 3/1977 | Cantrell et al. | 293/102 |
| 4,039,215 | 8/1977 | Minhinnick | 293/142 |
| 4,111,478 | 9/1978 | Pompei et al. | 293/126 X |
| 4,142,753 | 3/1979 | Klie et al. | 293/102 |
| 4,167,282 | 9/1979 | Matsuyama | 293/121 X |
| 4,350,378 | 9/1982 | Wakamatsu | 293/120 |
| 4,361,352 | 11/1982 | Wakamatsu | 293/120 |
| 4,397,490 | 8/1983 | Evans et al. | 293/135 X |
| 4,457,547 | 7/1984 | Sekiyama et al. | 293/110 |
| 4,466,646 | 8/1984 | Delmastro et al. | 362/82 X |
| 4,474,395 | 10/1984 | Harloff et al. | 293/120 |
| 4,482,180 | 11/1984 | Huber et al. | 293/120 |
| 4,646,863 | 3/1987 | Yamada | 293/120 |

*Primary Examiner*—Douglas C. Butler
*Attorney, Agent, or Firm*—Leydig, Voit & Mayer

[57] ABSTRACT

A rear end portion of a bumper outer cover, an upper flange of a backing member and a retainer are fastened together, with bolts and nuts, in the places that are concealed by a concealing flange of the bumper outer cover and the front end of an engine hood. The rear end portion, upper flange and retainer are formed with relief cuts in the place opposing to retractable head lamps so as to not only provide an increased clearance between a bumper assembly and the retractable head lamps but remove part of the rear end portion and its corresponding parts of the retainer and the upper flange that are otherwise exposed to view when the head lamps are moved to their projected positions.

7 Claims, 3 Drawing Sheets

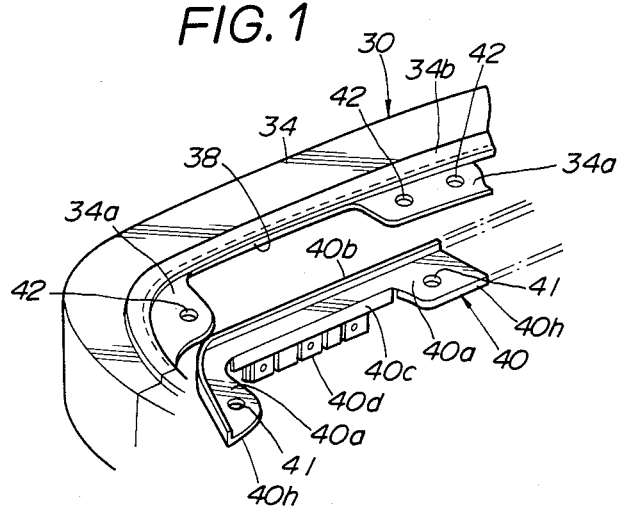
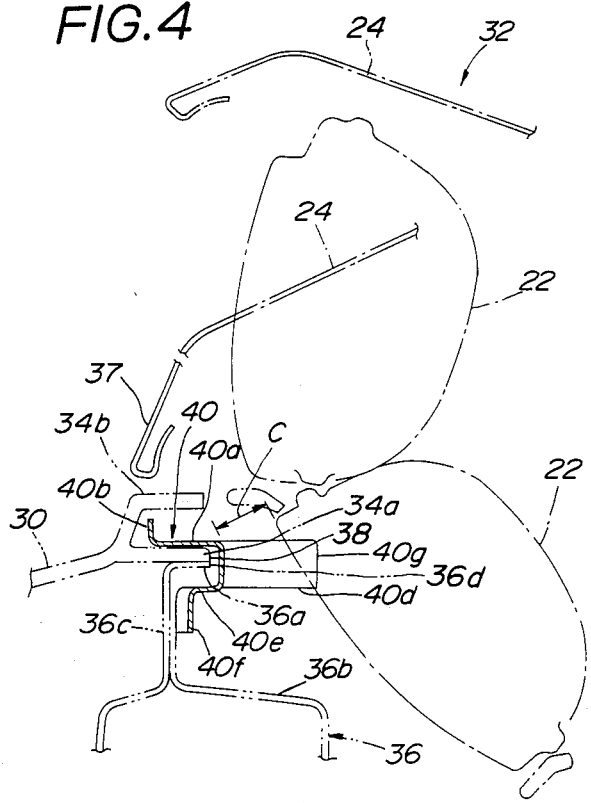

FRONT BUMPER ASSEMBLY FOR RETRACTABLE HEAD LAMP-EQUIPPED VEHICLE

BACKGROUND OF THE INVENTION

1. Field of the Invention

The present invention relates in general to bumpers for automotive vehicles and more particularly to a front bumper assembly for an automotive vehicle equipped with retractable head lamps.

2. Description of the Prior Art

An example of a prior art bumper assembly of the above described kind is shown in FIGS. 7 and 8. The bumper assembly consists of a bumper facer or bumper outer cover 10 formed of an elastomeric material such as urethanes or polyester elastomers by a known technique such as injection moulding, a rigid bumper armature or bumper backing member 12 secured to the outer cover 10, and an energy absorbing member 14 received within the outer cover 10 and abutting the backing member 12.

The outer cover 10 has an upper wall rear end portion 10a secured to the backing member 12 with bolts and nuts 16, 18 and a retainer 20, and a concealing flange 10b which cooperates with the front end of an unshown engine hood to conceal the rear end portion 10a. In case, however, of a vehicle equipped with retractable head lamps 22 as shown in FIG. 8, the rear end portion 10a is exposed to view when the retractable head lamps 22 are moved to their projected positions together with head lamp lids 24, thus deteriorating the appearance of the vehicle.

In order to solve this problem, it has been proposed to utilize a concealing member 26 for concealing the rear end portion 10a, bolts and nuts 16, 18 and retainer 20. With this structure, the rear end portion 10a is located close to the retractable head lamps 22 in their retracted positions, and furthermore the provision of the concealing member 26 causes reduction in the clearance C between the bumper assembly and the head lamps 22, resulting in that even upon a light head-on collision of the vehicle the head lamps 22 are likely to be struck by the concealing member 26, retainer 20, etc. to be damaged thereby.

SUMMARY OF THE INVENTION

In accordance with the present invention, a rear end portion of a bumper outer cover is formed with a relief cut so as to not only provide an increased clearance between a bumper assembly and a retractable head lamp but remove part of the rear end portion that is otherwise exposed to view when the head lamp is moved to its projected position. The rear end portion of the bumper outer cover is fastened to the bumper backing member in the places that are concealed by a concealing flange of the bumper outer cover and an engine hood. The bumper backing member and retainer are formed with relief cuts corresponding to the relief cut of the bumper outer cover.

The above structure is quite effective for overcoming the above noted shortcomings and disadvantages inherent in the prior art structure.

It is accordingly an object of the present invention to provide a novel and improved front bumper assembly for a retractable head lamp-equipped vehicle which can improve the appearance of the vehicle and at the same time assuredly prevent retractable head lamps from being damaged by a retainer, bumper backing member, etc. upon a light head-on collision of the vehicle.

BRIEF DESCRIPTION OF THE DRAWINGS

FIG. 1 is a fragmentary perspective view of a bumper outer cover and a retainer of a front bumper assembly according to an embodiment of the present invention;

FIG. 4 is a sectional view taken along the line IV—IV of FIG. 2;

DETAILED DESCRIPTION OF THE PREFERRED EMBODIMENT

Figure 2:
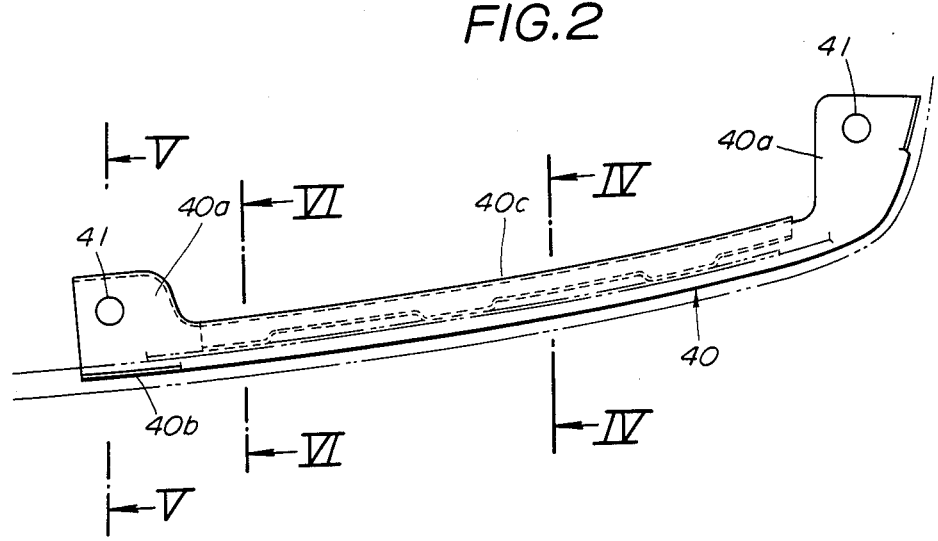
FIG. 2 is an enlarged top plan view of the retainer of FIG. 1.
Figure 3:
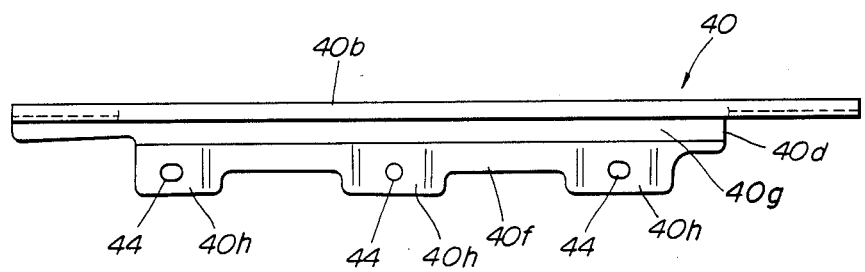
FIG. 3 is a side elevational view of the retainer of FIG. 2.
Figure 5:
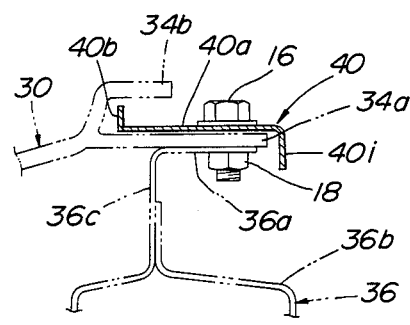
FIG. 5 is a sectional view taken along the line V—V of FIG. 2.
Figure 6:
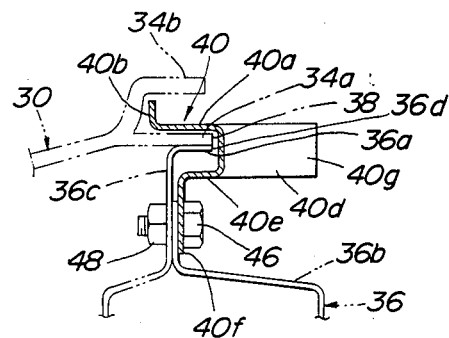
FIG. 6 is a sectional view taken along the line VI—VI of FIG. 2.
Figure 7:
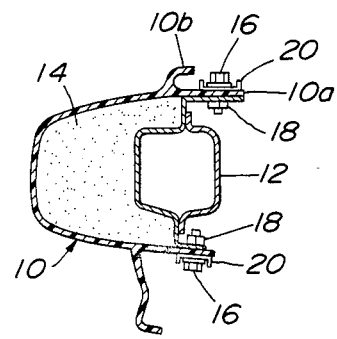
FIG. 7 is a sectional view of a prior art front bumper assembly.
Figure 8:
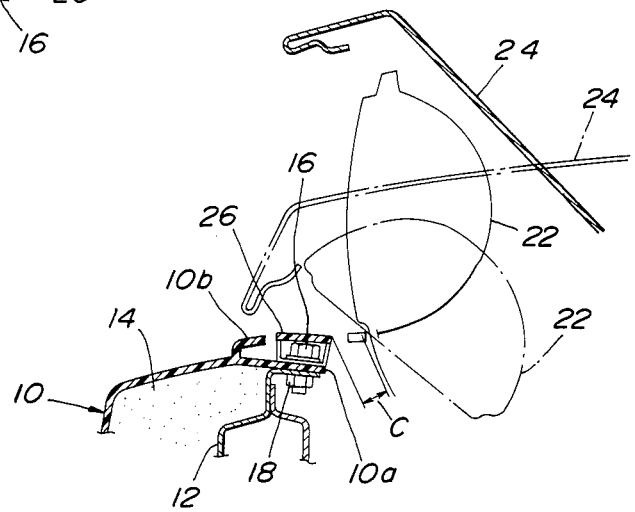
FIG. 8 is a fragmentary sectional view of the front bumper assembly of FIG. 7 together with a retractable head lamp.

Referring to FIGS. 1 through 6, in which elements or parts identical with those of the prior art structure of FIGS. 7 and 8 are designated by the same reference characters, a front bumper assembly of this invention comprises an outer cover 30 extending along a front end of a vehicle body 32 and bent at its longitudinal ends so as to extend further along the respective front end corners of the vehicle body 32. The outer cover 30 has a U-like cross section and includes an upper wall 34 and a lower wall (not shown) located in opposition to the upper wall 34. The upper wall 34 has a nearly horizontal rear end portion 34a for attachment to a correspondingly horizontal upper flange 36a of a backing member 36, and a concealing flange 34b located above the rear end portion 34a and cooperative with the front end of an engine hood 37 to conceal the rear end portion 34a.

The bumper backing member 36 also has a box-like sectional portion 36b and an upper upstanding wall 36c extending between the front end of the upper flange 36a and the box-like sectional portion 36b. Though not shown, the backing member 36 further has (refer to FIGS. 7 and 8) a nearly horizontal lower flange and a lower upstanding wall extending between the box-like sectional portion 36b and the front end of the nearly horizontal lower flange. The lower flange of the backing member 36 is fastened to the lower wall of the outer cover 30 in the conventional manner as shown in FIGS. 7 and 8.

The rear end portion 34a of the bumper outer cover 30 is formed with a relief notch or cut 38 in the place opposing to a retractable head lamp 22 so that the relief cut 38 can provide an increased clearance between the rear end portion 34a and the retractable head lamp 22. In this connection, the upper flange 36a of the backing member 36 is formed with a relief notch or cut 36d corresponding in position and shape to the relief cut 38. The rear end portion 34a of the bumper outer cover 30 is fastened to the upper flange 36a of the backing member 36 with bolts and nuts 16, 18 and a retainer 40. To this end, the rear end portion 34a is formed with a plurality of bolt accommodation holes 42 for accommodation of the bolts 16, two of which holes 42 are so located as to interpose therebetween the relief cut 38.

The retainer 40 is located adjacent the retractable head lamp 22, i.e., adjacent one of the longitudinal ends of the bumper outer cover 30 and has a planar base wall 40a placed on the rear end portion 34a of the bumper outer cover 30 to elongate in the longitudinal direction of the bumper outer cover 30. The retainer 40 also has a front flange 40b upstanding from the front end of the base wall 40a and received in the space between the concealing flange 34b and the rear end portion 34a. The base wall 40a of the retainer 40 is formed with a relief notch or cut 40c similar in shape and corresponding in position to the relief cut 38 so that the relief cut 40c can provide an increased clearance C between the rear end of the base wall 40a, i.e., the rear end of the retainer 40 and the retractable head lamp 22. The base wall 40a has at the opposite longitudinal ends thereof two bolts accommodation holes 41 for accommodation of the bolts 16, which holes 41 are so located as to interpose therebetween the relief cut 40c. The retainer 40 further has a depending wall 40d depending from tee rear end portion of the base wall 40a which defines a forward, nearly straight peripheral portion of the relief cut 40c. The depending wall 40d consists of a first wall portion 40e extending along the lower side of the rear end portion 34a of the bumper outer cover 30 so that the rear end portion 34a and the upper flange 36a of the backing member 36 are interposed between the first wall portion 40e and the base wall 40a, a second wall portion 40f extending downwardly from the front end of the first wall portion 40e and along the upstanding wall 36c, of the backing member 36, and a third wall portion 40g extending between the rear ends of the first wall portion 40e and the base wall 40a. The second wall portion 40f of the depending wall 40d is formed with three attaching seats 40h projecting forwardly to contact the upstanding wall 36c of the backing member 36. The attaching seats 40h are arranged in row in the longitudinal direction of the bumper outer cover 30 and formed with bolt accommodation holes 44, whilst the upstanding wall 36c of the backing member 36 is formed with, though not shown, bolt accommodation holes aligned with the bolt accommodation holes 44. The depending wall 40d is fastened to the upstanding wall 36c of the backing member 36 with bolts and nuts 46, 48, which bolts 46 are arranged to pass through the bolt accommodation holes 44. In this connection, the bolt accommodation holes 44 formed in two of the attaching seats 40h on the opposite sides of the central seat 40h is formed into an elongated shape elongating in the longitudinal direction of the bumper outer cover 30 so that thermal deformation of the retainer 40 does not cause misalignment of the bolt accommodation holes 44 with the corresponding bolt accommodation holes of the backing member 36. The retainer 40 further has a rear flange 40i depending from the rear end of the base wall 40a except for the portion thereof to which the abovementioned depending wall 36d is provided.

In the above, it will be understood that while the present invention has been described and shown as to the portion of the bumper assembly adjacent one of the head lamps 22, i.e., one of the longitudinal ends of the bumper outer cover 30, the portion of the bumper assembly of this invention adjacent the other head lamp 22 or adjacent the other longitudinal end is structured similarly to the above though symmetrically about the longitudinal center axis of the vehicle body 32.

It is to be further understood that the bumper outer cover 30 and the backing member 36 are fastened to each other at the portions intermediate between the opposite longitudinal ends thereof in the conventional manner.

From the foregoing, it will be appreciated that even when the head lamp lids 24 are moved to their projected positions in use of the head lamps 22, the bolts and nuts 46, 48 are not exposed to view since they are located behind the rear end portion 34a of the bumper outer cover 34 which is covered by the base portion 40a of the retainer 40, thus not deteriorating the appearance without the necessity of any additional concealing member.

It will be further appreciated that the bolts and nuts 16, 18 are not exposed to view so long as the engine hood is in the closed position since the rear end portion 34a of the bumper outer cover 30 is concealed by the front end of the engine hood 37 and the concealing flange 34b even when the head lamps 22 are moved to their projected positions together with the head lamp lids 24.

It will be further appreciated that the head lamps 22 are assuredly prevented from being damaged upon a light head-on collision of the vehicle since a sufficient clearance C is provided between the retainer 40 and the head lamps 22 by the effect of the relief cuts 40c, 38, 36d provided to the retainer 40, the rear end portion 34a of the bumper outer cover 30 and the upper flange 36a of the backing member 36.

What is claimed is:

1. A front bumper assembly for a vehicle having a retractable head lamp and an engine hood, comprising:
    a bumper outer cover of a U-like cross section, including an upper wall having a nearly horizontal rear end portion and a concealing flange cooperative with the engine hood to conceal said rear end portion;
    a bumper backing member having an upper flange on which said rear end portion is placed;
    a retainer placed on said rear end portion;
    said rear end portion, said upper flange and said retainer being fastened together, with bolts and nuts, in the places that are concealed by said concealing flange and the engine hood even when the head lamp is moved to its projected position; and
    an energy absorbing member received within said outer cover and abutting said backing member;
    said rear end portion, said upper flange and said retainer being formed with relief cuts in the place opposing to the head lamp so as to not only provide an increased clearance between the bumper assembly and the head lamp but remove part of said rear end portion and its corresponding parts of said retainer and said upper flange that are otherwise exposed to view when the head lamp is moved to its projected position.

2. A front bumper assembly as set forth in claim 1 wherein said rear end portion of said bumper outer cover is formed with two bolt accommodation holes for accommodation of said bolts, which bolt accommodation holes are spaced from each other in the longitudinal direction of the bumper outer cover so as to interpose therebetween said relief cut of said rear end portion.

3. A front bumper assembly as set forth in claim 2 wherein said bumper backing member has a box-like sectional portion and an upper upstanding wall extending between a front end of said upper flange and said box-like sectional portion and wherein said retainer has a base wall placed on said rear end portion of said bumper outer cover to elongate in the longitudinal direction of said bumper outer cover and has a rear end formed with said relief cut, a front flange upstanding from a front end of said base wall and received in a space between said rear end portion of said bumper outer cover and said concealing flange, and a depending wall depending from the rear end of said of base wall which defines a forward, nearly straight peripheral portion of said relief cut of said retainer, said depending wall consisting of a first wall portion extending along a lower side of said rear end portion of said bumper outer cover so that said rear end portion of said bumper outer cover and said upper flange of said backing member are interposed between said first wall portion and said base wall, a second wall portion extending downwardly from a front end of said first wall portion and along said upstanding wall of said backing member, and a third wall portion extending between rear ends of said first wall portion and said base portion, said second wall portion being fastened to said upstanding wall of said backing member with bolts and nuts.

4. A front bumper assembly as set forth in claim 3 wherein said second wall portion of said retainer is formed with three attaching seats projecting forwardly to contact said upstanding wall of said backing member, said attaching seats being arranged in row in the longitudinal direction of the bumper outer cover and respectively formed with bolt accommodation holes for accommodation of said second mentioned bolts.

5. A front bumper assembly as set forth in claim 4 wherein said bolt accommodation holes formed in two of said attaching seats on opposite sides of central one of said attaching seats is formed into an elongated shape elongating in the longitudinal direction of said bumper outer cover.

6. A front bumper assembly as set forth in claim 5 wherein said base wall of said retainer has at the longitudinal ends thereof two bolts accommodation holes for accommodation of said first mentioned bolts, which bolt accommodation holes are so located as to interpose therebetween said relief cut of said retainer.

7. A front bumper assembly as set forth in claim 6 wherein said retainer further has a rear flange depending from the rear end of said base wall except for a portion defining said portion of said relief cut.

* * * * *